United States Patent

[11] 3,575,431

| [72] | Inventor | Austin U. Bryant |
| | | Walnut Creek, Calif. |
| [21] | Appl. No. | 753,545 |
| [22] | Filed | Aug. 19, 1968 |
| [45] | Patented | Apr. 20, 1971 |
| [73] | Assignee | Grove Valve and Regulator Company |
| | | Oakland, Calif. |

[54] SEAL ASSEMBLY
3 Claims, 8 Drawing Figs.

[52] U.S. Cl. .................................................. 277/171,
277/207, 251/327, 251/315
[51] Int. Cl. ....................................................F16g 15/00;
F16g 9/00
[50] Field of Search .......................................... 277/171,
207; 251/327, 328, 332, 315

[56] References Cited
UNITED STATES PATENTS

| 2,462,493 | 2/1949 | Hamer | 277/171X |
| 3,095,177 | 6/1963 | Muller | 277/207UX |
| 3,263,961 | 8/1966 | Varga | 251/332 |
| 3,301,523 | 1/1967 | Lowrey | 251/328X |
| 3,425,662 | 2/1969 | Bryant et al. | 251/328 |

Primary Examiner—Samuel Rothberg
Attorney—Melvin R. Stidham

ABSTRACT: A main seal assembly for a valve comprising a resilient seal ring carried in an annular groove or recess in one working surface to seal against an opposing working surface. The inner sidewall portions of the recess are sloped in converging relationship from the bottom surface and then merge into generally parallel outer sidewall portions forming a relatively narrow opening. The seal ring is of generally triangular cross section with lateral protuberances that seal against the sloping inner sidewall portions of the recess and is mechanically retained by the narrow outer recess opening. A relatively thin outer protuberance extends freely between the outer sidewall portions of the recess to seal against the opposing working surface.

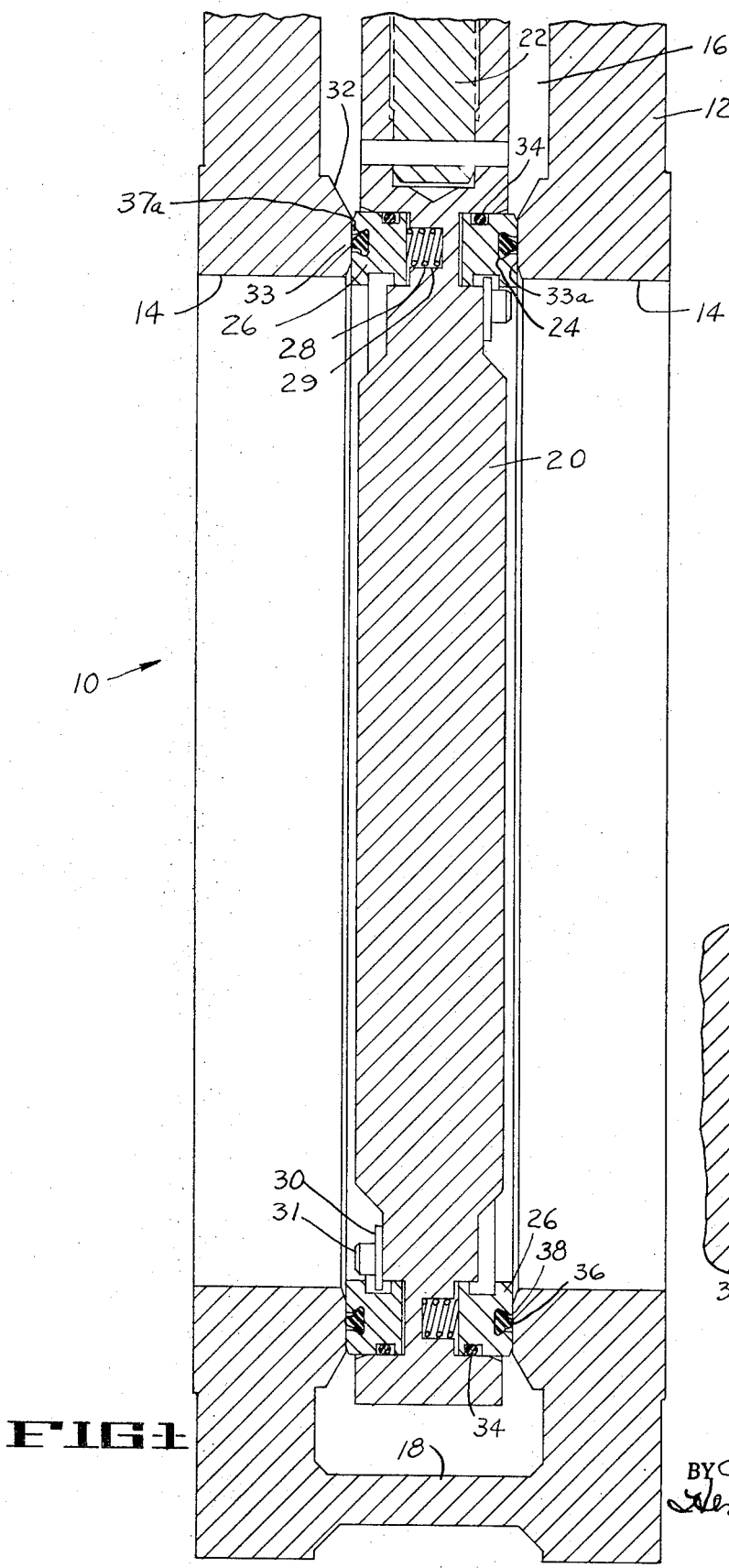
FIG-1-
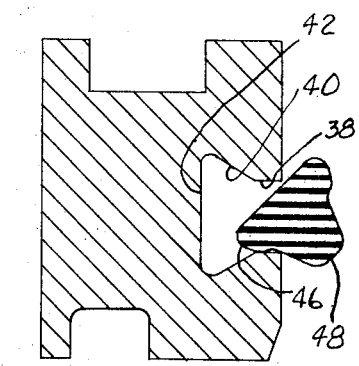
FIG-2-
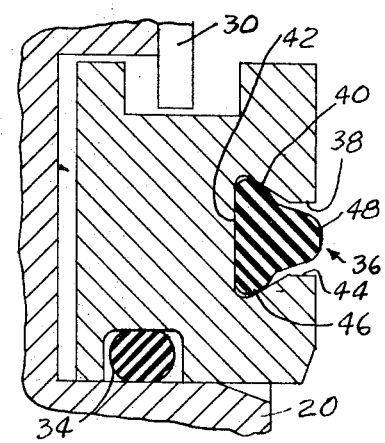
FIG-3-
INVENTOR.
AUSTIN U. BRYANT
BY Lippincott, Gregg,
Hendricson & Stidham
ATTORNEYS Patented April 20, 1971
3,575,431
3 Sheets-Sheet 2
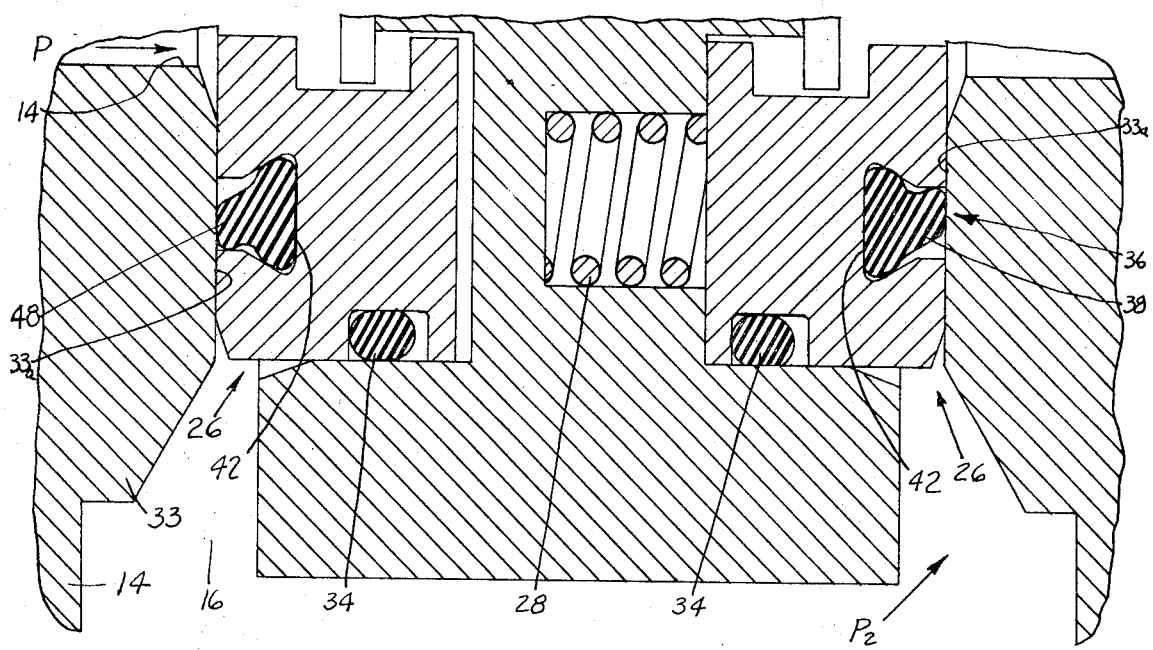
FIG-4-
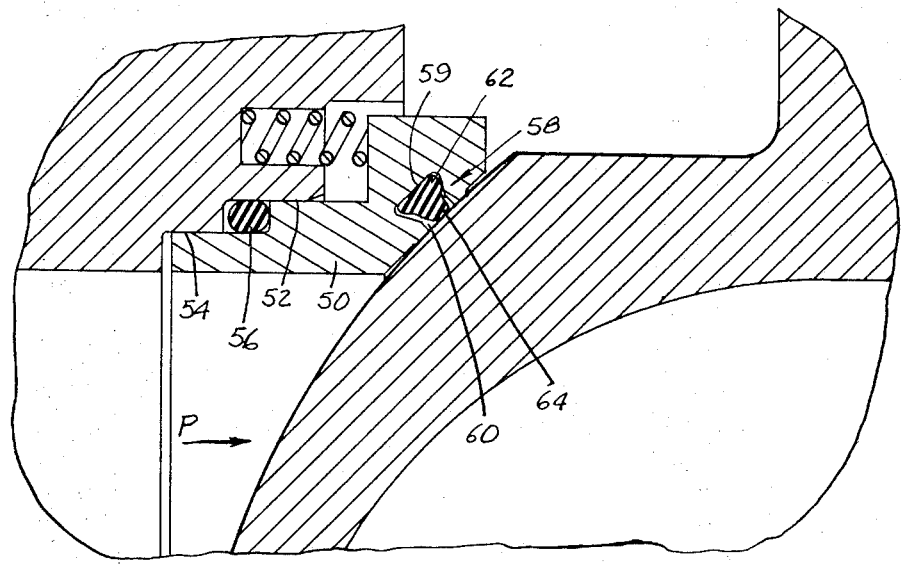
FIG-5-
INVENTOR.
AUSTIN U. BRYANT
BY
ATTORNEYS

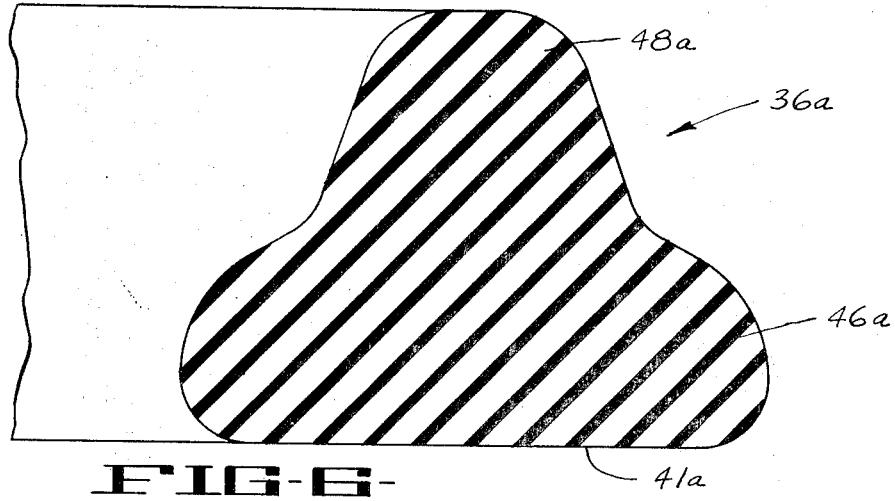
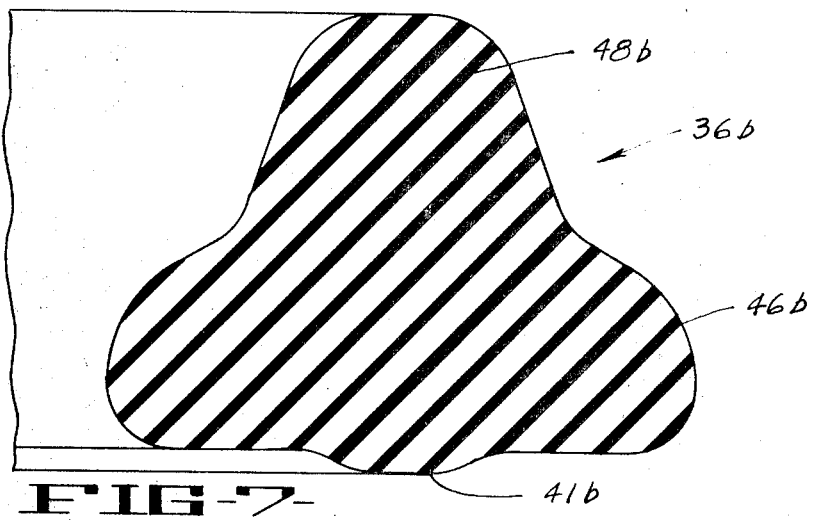
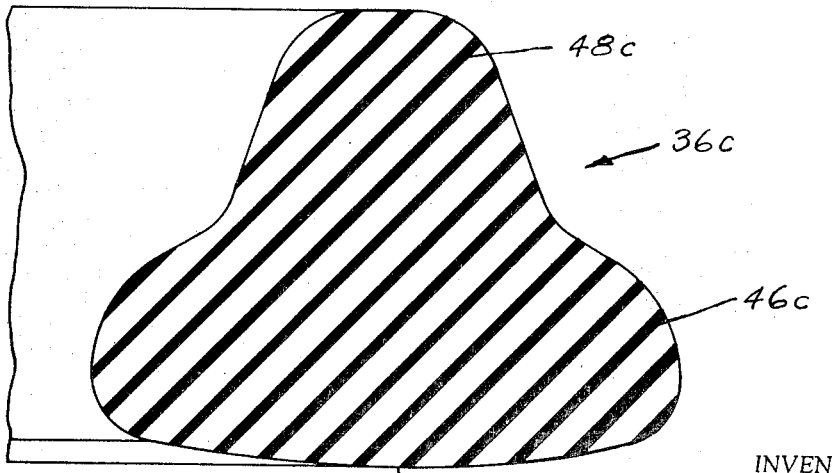

SEAL ASSEMBLY

DESCRIPTION

This invention relates to a seal assembly, and, more particularly, to a valve seal assembly including a resilient seal which is mechanically retained within a recess but which has an outer sealing portion which is free to move within the recess whereby distortion under pressure is accommodated.

Resilient seal rings of natural or synthetic rubber or the like have proved to be highly advantageous as main valve seals because they are capable of providing an effective fluidtight seal despite irregularities in the surfaces against which they are sealing. The resilient material will distort under fluid pressure and conform to the opposing working surfaces of the valve to form an effective seal over a wide range of line pressures. Such resilient seal rings are advantageously carried in seat ring assemblies of a harder material such as metal which carry the load of high-pressure fluids asserted against it, with the resilient seal ring being carried in a groove or recess with a portion extending out of the recess to accomplish the sealing.

Superior sealing results have been realized with a resilient ring of the O-ring type movably carried within a groove in metallic seat rings so that there is room within the recess to accommodate the distortion of the ring under pressure. However, with O-rings loosely carried within the recess, there is a danger that the ring will be extruded or blown out of its recess when the valve is opened or closed, subjecting the seal ring to severe damage as the valve member moves past it, and at high pressures the seal ring may be blown completely out of its recess and carried downstream. In order to alleviate this problem, I have developed a seat ring assembly illustrated and described in my U.S. Pat. No. 3,109,623 wherein the bottom of the recess or groove in which the upstream seal ring is carried, is vented to the body space so that when the seal ring is exposed to line pressure, the pressure differential from the outside of the recess to the recess bottom tends to force the seal ring further into its recess.

Another difficulty encountered in use of O-rings as valve sealing means, and particularly valves of large diameter, with moderately soft O-rings, resides in the fact that the O-rings may be rolled and twisted as the valve working surfaces slide across each other during valve operation.

Other resilient seal rings have been developed wherein the seal ring is bonded or firmly squeezed within the recess for mechanical retention. However, such seal rings have no room within the recess in which to deform and they are subjected to wear or shearing by the valve member moving past them.

It is, therefore, an object of this invention to provide a seal ring which is firmly retained within a recess which still allows room for accommodation of deformation.

A further object of this invention is to provide a seal ring which provides a positive convex outer sealing portion and lateral sealing portions to seal against the sides of the recess.

It is a further object of this invention to provide a seal assembly including a generally triangular seal ring with lateral protuberances at the base and a seat ring with a recess that is wider near the bottom to hold the seal in place mechanically.

It is a further object of this invention to provide a seal assembly comprising a one-piece seat ring having a recess with a wide bottom portion and a narrow outer portion which still enables placement of a wide-base resilient seal.

It is a further object of this invention to provide a valve seal assembly including a relatively soft seal ring which may be inserted in a one-piece seat ring and retained therein mechanically against fluid pressure.

It is a further object of this invention to provide a relatively soft seal ring which resists rolling or twisting.

In carrying out this invention, I provide a recess, preferably in a seat ring on either the body or the valve closure member. The inner sidewall portions of the recess slope toward each other from the bottom and then merge into outer sidewall portions which are generally parallel to each other. The seat ring is of generally triangular cross section with lateral protuberances on both sides adjacent the base and a narrow outer protuberance with an outer arcuate convex sealing portion which extends freely between the parallel outer sidewall portions of the recess. The seal may be inserted by twisting it so that a lateral protuberance is inserted between the parallel outer portions of the recess. The lateral protuberances are restrained by the sloping inner sidewall recess portions to retain the seal ring mechanically against fluid pressure which may tend to force it out of its recess. The outer protuberance, however, is free to move laterally within the outer sidewall portions so that it can be distorted radially inward or outward or simply be flattened as the seal ring is squeezed between the recess bottom and the opposing working surface to seal off flow around it. In any case the outer sidewall portions provide room within the recess to accommodate the distortion.

Other objects and advantages of this invention will become apparent from the description following when read in conjunction with the accompanying drawings wherein:

FIG. 1 is a partial section view of a gate valve with a seat ring assembly embodying features of this invention;

FIG. 2 is an enlarged partial section view illustrating placement of a seal ring;

FIG. 3 is an enlarged partial section view of a seal ring assembly;

FIG. 4 is an enlarged partial vertical section view of the gate valve in closed position under pressure;

FIG. 5 is a partial section view of a seat ring assembly adapted for a ball valve; and FIGS. 6, 7 and 8 are enlarged section views of alternate forms of seal rings forming a part of this invention.

Referring now to FIG. 1 with greater particularity, there is shown a gate valve 10 having opposing end walls 12 with flow passages 14 formed therein. The body space 16 between the end walls 12 is enclosed by a body band 18 and the gate 20 is carried between the end walls and mounted on a valve stem 22 for vertical movement into and out of alignment with the flow passages 14.

Carried within grooves 24 cut in opposite sides of the gate are seat rings 26 which are biased outward into engagement with the opposite end walls by means of coil springs 28 carried in holes 29 which are bored into the gate through the bottoms of the recesses. Axial movements of the seat rings 26 are limited by suitable stop members, such as washers 30, which may be secured to the gate 20 by cap screws 31 so that when the gate is raised into the body space 16, the seat rings 26 will not drop from the recesses 24. When the gate is lowered, chamfer surfaces 32 on opposing working members 33 cam the seat rings in until they engage the working surface 33a.

Suitable seal means such as the O-rings 34 shown are provided to seal against leakage around the seat rings and the main seal rings 36 are carried in recesses 38 in the outer faces of the seat rings 26. Referring now to FIG. 3, it will be noted that the recess has sloping inner sidewall portions 40 which converge from the bottom surface 42 until they merge into generally parallel outer sidewall portions 44. Contained within that recess is the seal ring 36 which, in cross section, is generally triangular with a pair of lateral protuberances 46 which, in the form shown in FIG. 2 are of arcuate convex configuration to make the seal ring 36 of an overall width at the base which is slightly greater than that of the recess 38 so that the protuberances 46 are squeezed between and firmly seal against the sloping inner sidewall portions 40. In the preferred embodiment shown, the seal ring 36 is reduced in width above the base to form a narrow outer protuberance 48 which extends freely between the recess outer sidewall portions 44 with clearances on both sides in absence of pressure. The seal ring is shown in FIG. 3 both out of sealing engagement and in absence of pressure so that the cross section is undeformed except where the lateral protuberances 46 engage the sloping inner sidewall portions 40. When the gate is in its closed position shown in FIG. 1 the seal ring 36 is compressed between the recess bottom 42 and the opposing working surfaces 33a. The wide base of the seal rings as well as the complementary sloping surfaces of the seal and recess restrain the seal rings against rolling and twisting as they slide across the working surfaces 33a during valve operation.

The configuration of the seal ring 36 is such that it may be inserted into the recess opening 38 despite its wide base 42. This may be accomplished by limiting the dimensions of the lateral protuberances measured from the base so that they will fit through the opening 38 by twisting the ring 36 as shown in FIG. 2 and progressively forcing portions of the ring into the recess. This is facilitated by the greater resilience of the thin outer portion 48. As the protuberance 46 is forced into its lower corner, the rest of the ring may be pressed into place. This gives a mechanically retained ring without requiring a two-piece seat ring to accommodate it, and the mechanical retention is such that relatively soft seals may be used for moderate pressure systems.

Referring now to FIG. 4, the seat ring assemblies 26 are shown in greatly enlarged scale to illustrate how seal ring distortion can be accommodated within the recesses 38. The seal rings 36 are compressed between the bottom 42 of the recess and the opposing working surfaces 33a and the outer sealing protuberance 48 provides an O-ring type of seal which is distorted radially outward and pressed more firmly against the opposing working surface 33a by upstream line pressure asserted against it and entering into the recess 38 from the left in FIG. 4 as indicated by the arrow P. The upstream pressure coming in behind the seat ring forces the outer O-ring 34 toward the front of its recess because the pressure in the body space 16 is normally somewhat lower. The upstream pressure may be sufficient to force the gate 20 downstream until the downstream seat ring 26 is bottomed in its recess against the force of coil spring 28. Because the direction of pressure differential $P_2$ is normally from the body space 16 to the downstream pressure, the downstream main seal ring 38 is distorted radially inward and the O-ring 34 sealing between the seat ring 26 and the gate 20 is forced to the rear of its recess as the body space fluid enters around the seat ring 26.

In FIG. 5, the seat ring 50 is carried within a bore 52 formed in the body of a ball valve with the tail portion of the seat ring slidable in a counterbore 54. An O-ring 56 is provided to prevent leakage around the seat rings and the main seal ring 58 is carried in an annular recess 60 in the face of the seat ring. Both the main seal ring and its recess are of the general configurations in cross section as those shown in FIGS. 1 to 4 although, of course, the base surface 59 is frustoconical to conform to the bottom of the recess. If desired, the seal ring 58 (and the seal ring 36 in the gate valve) may be carried loosely within its recess and not squeezed between the sloping recess walls. Specifically, with the line pressure from the left as indicated by the arrow P the lateral protuberance 62 on the radially outward side of the seal ring 58 is pressed against the sloping inner sidewall on the downstream side of the recess but the protuberance on the upstream side is free of sealing engagement. As in the other embodiment, the outer sealing protuberance 64 extends freely between the generally parallel outer sidewall portions of the recess 60.

Referring now to FIGS. 6, 7 and 8 there is illustrated in cross section three alternative configurations of the seal ring of this invention. In FIG. 6, the bottom surface 41a of the seal ring 36a is flat so as to provide a seal completely across the bottom surface of its recess when in place. As shown the seal ring also includes lateral and outer protuberances 46a and 48a.

In FIG. 7 the bottom surface 41b of the seal 36b is provided with a small arcuate ridge or protuberance to provide an O-ring type of seal with the bottom of its recess. With fluid pressure being transmitted through the resilient material of the seal ring 36c it is concentrated in the ridge for greater sealing pressure.

FIG. 8 shows a similar form of seal ring 36c wherein the bottom surface 41c is convex though not ridged. This combines the features of the other two embodiments 36a and 36b.

While this invention has been described in conjunction with preferred embodiments thereof, it is obvious that modifications and changes therein may be made by those skilled in the art without departing from the spirit and scope of this invention as defined by the claims appended hereto.

I claim:

1. A sealing assembly for a valve having a movable valve closure member in a valve body and opposing annular sealing members on said closure member and said body comprising:

an annular recess in one of said sealing members, inner sidewall portions of said recess being of sharply convergent relationship outward from the bottom surface of said recess, and, outer sidewall portions of said recess being generally parallel, said sidewall portions being of one-piece construction, a resilient seal ring carried in said recess, said seal ring being of generally triangular cross section with a lateral protuberance on each side thereof adjacent the base thereof engageable with and restrained by the inner portion of one sidewall of said recess, the width of said seal ring at the level of said lateral protuberances being greater than the space between the outer sidewall portions of said recess, and an outer main sealing protuberance extending with clearance between said outer sidewall portions, said lateral protuberances being capable of being inserted between said outer sidewall portions and being sufficiently flexible that when one lateral protuberance is inserted between said outer sidewall portions into the space between said inner portions the other lateral protuberance engages an edge portion of an outer sidewall portion so that said other lateral protuberance may be distorted to rotate said seal ring into said recess, but sufficiently rigid that said inner sidewall portions retain said seal ring mechanically.

2. The sealing assembly defined by claim 1 wherein: the base of said generally triangular cross section is convex.

3. The sealing assembly defined by claim 1 including: a ridge extending from the base of said generally triangular cross section forming an annular inner sealing surface.